United States Patent [19]

Spannenburg

[11] Patent Number: 5,374,976
[45] Date of Patent: Dec. 20, 1994

[54] SUPPORT PROVIDED WITH A MACHINE DETECTABLE COPYING SECURITY ELEMENT

[75] Inventor: Sijbrand Spannenburg, Nt Petten, Netherlands

[73] Assignee: Joh. Enschede en Zonen Grafische Inrichting B.V., Haarlem, Netherlands

[21] Appl. No.: 105,783

[22] Filed: Aug. 12, 1993

Related U.S. Application Data

[63] Continuation of Ser. No. 806,878, Dec. 12, 1991, abandoned.

[30] Foreign Application Priority Data

Dec. 13, 1990 [NL] Netherlands .......................... 9002740

[51] Int. Cl.$^5$ ...................... G03G 21/00; B42D 15/00
[52] U.S. Cl. ...................................... 355/201; 283/72; 283/94; 283/901; 283/902; 355/200
[58] Field of Search .................. 355/200, 201; 380/54, 380/55; 356/71; 283/72, 73, 74, 94, 901, 902

[56] References Cited

U.S. PATENT DOCUMENTS

| | | |
|---|---|---|
| 4,168,088 | 9/1979 | Somlyody .................. 283/902 X |
| 4,175,774 | 11/1979 | Tonges et al. .................. 283/902 X |
| 4,210,346 | 7/1990 | Mowry, Jr. et al. . |
| 4,227,719 | 10/1980 | McElligott et al. .............. 283/94 X |
| 4,310,180 | 1/1982 | Mowry, Jr. et al. ........... 283/902 X |
| 4,579,370 | 4/1986 | Corwin et al. ......................... 283/72 |
| 4,891,666 | 1/1990 | Gordon ............................ 355/201 X |
| 5,078,428 | 1/1992 | Maeno ............................. 283/902 X |

FOREIGN PATENT DOCUMENTS

| | | | |
|---|---|---|---|
| 3419859 | 1/1985 | Germany . | |
| 0017778 | 1/1985 | Japan .................................. | 355/201 |

Primary Examiner—A. T. Grimley
Assistant Examiner—Sandra L. Brasé
Attorney, Agent, or Firm—Ladas & Parry

[57] ABSTRACT

A support provided with a machine-detectable security element, particularly a copying-security element. The security element comprises a first image perceptible to the human visual system, said first image incorporating a second image that is substantially imperceptible to the human visual system.

20 Claims, 14 Drawing Sheets

SUPPORT PROVIDED WITH A MACHINE DETECTABLE COPYING SECURITY ELEMENT

This is a continuation of copending application(s) Ser. No. 07/806,878 filed on Dec. 12, 1991, now abandoned.

The invention relates to a support provided with a machine-detectable security element, particularly a copying-security element.

Now sophisticated copiers, such as colour copiers with a matrix laser scanner in particular, and graphic lay-out stations are becoming available for an increasing public, large numbers of photocopies of an original can be produced in an inexpensive and rapid way, the photocopies being not at all—or scarcely—distinguishable from the original.

In order to put an end to this technique of copying documents such as valuable documents, e.g. bank notes, or confidential documents, one thought of providing the support with a copying-security element detectable by a copier, so that in the event of detection suitable measures can be taken. In this concept, the copying-security element is formed by an object that is detectable by the copier, e.g. a filament which is incorporated in the support during the manufacturing process of the support, or by a unique type of printing ink having particular optical features. Furthermore, the copier should be provided with suitable detection means.

The invention aims to provide a support with a security element without any special treatment of the support or the use of special printing inks being required for the provision of the security element.

For this purpose, according to the invention, a support of the type described in the preamble is provided, characterized in that the security element comprises a first image perceptible to the human visual system which incorporates a second image that is substantially imperceptible to the human visual system.

Additional purposes, characteristics and advantages of the support according to the invention will become clear after the following description of a number of preferred embodiments of the support according to the invention, in which references are made to the accompanying drawing, wherein:

FIG. 1b shows an enlargement of a copy of the image of FIG. 1a;

FIG. 2b shows a partial enlargement of FIG. 2a;

FIG. 2c shows an enlargement of a copy of the image of FIG. 2a;

FIG. 3a shows an enlargement of an image on a support according to the invention, in said image the copying-security element of FIG. 2a being superposed on the image of FIG. 1a;

FIG. 3b shows an enlargement of a copy of the image according to FIG. 3a;

FIG. 4b shows a partial enlargement of FIG. 4a;

FIG. 4c shows an enlargement of a copy of the image according to FIG. 4a;

FIG. 5a shows an enlargement of an image on a support according to the invention, wherein the copying-security element of FIG. 4a is superposed on the image of FIG. 1a; and FIG. 5b shows an enlargement of a copy of the image according to FIG. 5a.

In order to make the description as clear as possible, all images represented in the figures are shown on a larger scale. Particularly the images according to FIGS. 2b, 2d, 4b and 4d are represented at six times the full scale, the other images are represented at circa three times the full scale. Whenever a normal distance of assessment is given below, one should take this enlargement into consideration. Furthermore, when assessing the undermentioned visual effects one should realize that the figures accompanying the description are in fact copies, even if they are referred to in the text as originals, which have been obtained by copying the originals once or every so often.

Figure 1A:
FIG. 1a shows an enlargement of an image on a support that is obtained by raster printing techniques.

FIG. 1a shows an image applied onto a support, said image being composed of image elements divided according to a regular raster pattern which consist of circular raster pixels, the surface of which, particularly the diameter, being modulated in a way that is common practice in techniques of printing with one or several colours by the use of one or more rasters. The image is represented at circa three times the full scale. The density of the raster pixels amounts to circa 100 dpi in reality, which corresponds to a distance of raster pixels of circa 250 $\mu$m. The support can be made of every material that is suitable for supporting an image perceptible to the human visual system, e.g. paper or synthetic materials.

In the event of a normal distance of assessment, the human visual system will be unable to discern any individual raster pixels, so that the image will be seen as a continuous halftone image.

Figure 1B:

FIG. 1b shows an enlargement of a copy of the image of FIG. 1a, said copy being obtained by means of a Cannon matrix laser copier having a resolution of 400 dpi and by laser scanning of the original in a matrix. As a result, the distance of the matrix grid of this copier is circa 60 $\mu$m. As the distance of the grid is smaller than that of the raster pixels, undersampling can be avoided, even when the standard model of the copier is provided with a digital filter operating on 3×3 submatrices.

Figure 2A:
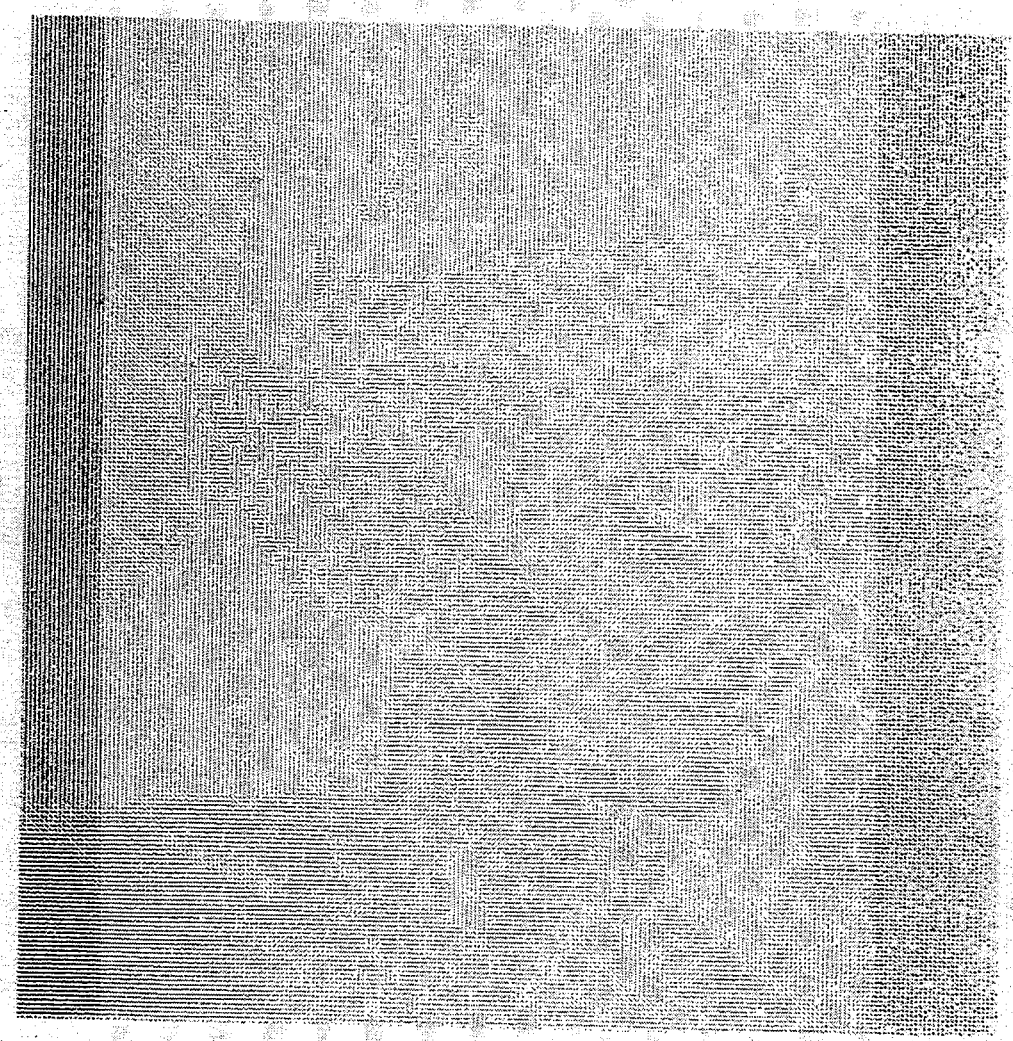
FIG. 2a shows an enlargement of a substantially uniform image on a support according to the invention that is provided with a first embodiment of a copying-security element.
Figure 2B:
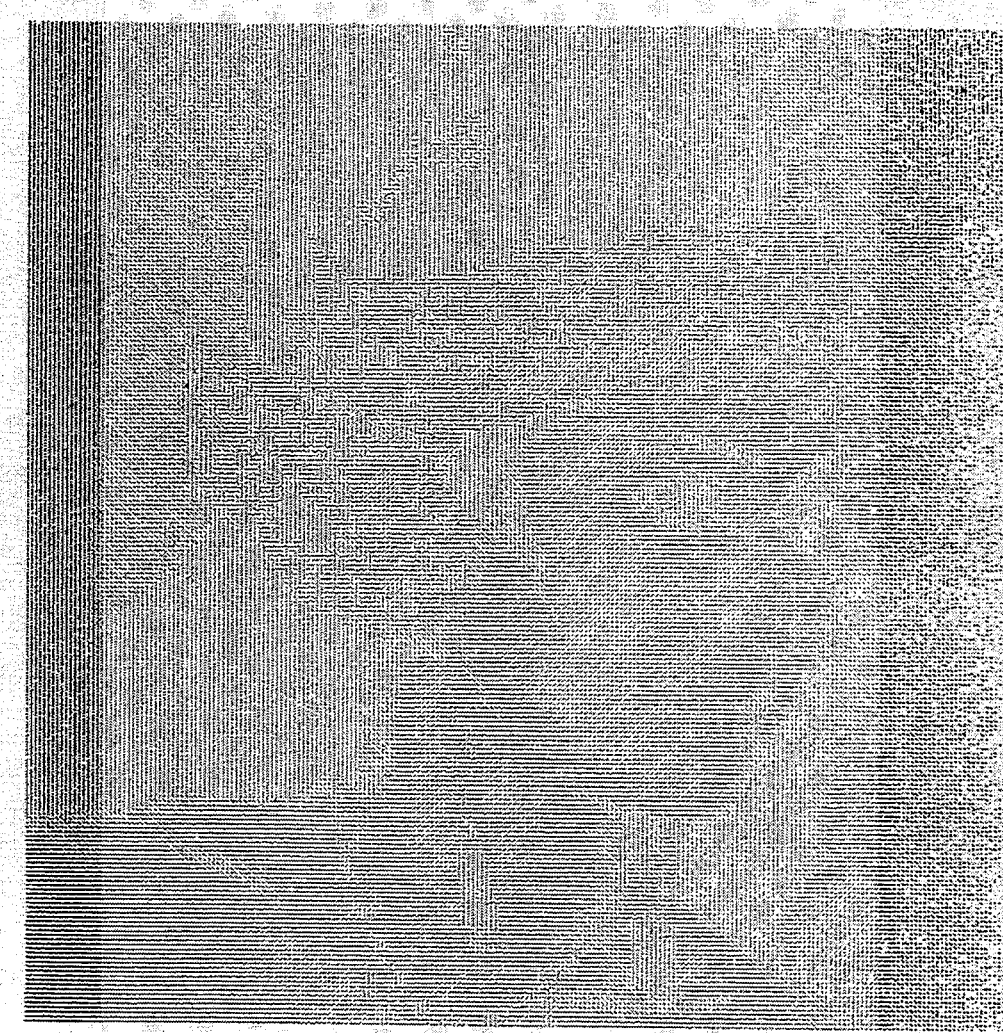

FIG. 2a shows an enlargement of an image of a support according to the invention, percepted by the human eye as a uniform image at a normal distance of assessment, the image being composed of image elements formed by raster elements or raster "pixels" of a density of 100 dpi, each raster point being shaped as a line segment instead of a circular point as in FIG. 1a. FIG. 2b shows a partial enlargement of FIG. 2a. This deformation of circular raster pixels into linear ones will be imperceptible to the human visual system at a normal distance of assessment, due to the high density of the raster pixels. In other words, a second image is incorporated in the uniform image in the form of a deformation of the image elements of the uniform image into line segments, said second image being imperceptible to the human eye at a normal distance of assessment. As the resolution of the copier is nevertheless of an adequate level, this copier will be able to distinguish circular raster pixels from linear ones. Consequently, when this deformation of the raster pattern is detected by the copier, a blocking circuit being part of the copier or connected to it will prevent the copying of the image and/or give an alarm.

Corresponding to a density of raster pixels of 100 dpi is a distance of raster pixels of circa 250 μm. The width of a line segment is 30 μm in this particular example. Such a width is feasible according to raster printing techniques that are currently available.

As is shown in FIG. 2a, not only the deformation into line segments, in this case the deformation of all the raster pixels although that is not necessary, but also the degree of deformation of the raster pixels differs due to different angular orientations of the line segments in the plane of the support. In that case the angular orientation is a function Φ of a gradation value of a picture corresponding to the mirror image of FIG. 1a. Therefore, the function Φ for the raster point i is represented by:

$$\phi_i = \frac{(d(x,y) - d_{gem})}{(d_{min} - d_{min})} \pi + \phi_0 \quad (1)$$

wherein d(x,y) is the gradation value of the picture at the point with the coordinates (x,y), $d_{min}$ is the minimum gradation value, $d_{max}$ is the maximum gradation value, and $\Phi_O$ is an initial angle which equals $\pi/2$ in the example.

Therefore, $\Phi_i$ varies continuously within the range $\pi/2$ to $3\pi/2$.

Figure 2C:
Figure 2D:
FIG. 2d shows a partial enlargement of FIG. 2c.

The copy of the image of FIG. 2a, obtained by means of the copier, said copy being represented in FIG. 2c, shows clearly that the copy's picture is perceptible indeed or at least considerably more perceptible to the human visual system at a normal distance of assessment. FIG. 2d shows a partial enlargement of FIG. 2c. This visual effect can be explained on account of the fact that the current sophisticated copiers are provided with digital filter circuits such as sharpness-enhancing filters. Furthermore, changes of colour seemed to occur in the copy, even when the original image was applied in black and white on the support. These changes of colour facilitate the perceptibility of the picture to the human visual system to a further degree. In addition to that, the orientation of the raster pattern of the support with respect to the matrix of the copier appears to have relevance, e.g. the angles 0°, 45° and 90°, as well as the mode in which the copier was set, e.g. normal mode or photo mode.

In this way, the support according to the invention is provided with a second image which is imperceptible at a normal distance of assessment, yet which is perceptible in the copy in the form of a picture to the human visual system at a normal distance of assessment, when the copier allows producing and supplying a copy, which can be the case, for example, when the copier is not provided with a copying-security element detection circuit and/or a blocking circuit. Therefore, without any additional appliances an original document can be distinguished from a copy. Besides, there are no special requirements with respect to the support and/or applied printing ink. A major advantage is that the copier can be of the currently used type which is not provided with special detection and blocking circuits.

Due to the fact that the deformation of the first image of the support according to the invention is not at all or scarcely perceptible, the second image can be superposed on an image that is modulated in the usual way, e.g. the image according to FIG. 1a, the amplitude of which is modulated. As an example, reference is made to FIG. 3a which shows an enlargement of an image on a support, the second image of FIG. 2a being superposed on the image of FIG. 1a. The modulation of the image perceptible to the human visual system is performed by modulating the width of the line segments similarly to the modulation of the diameter of the circular raster pixels in FIG. 1a.

Figure 3A:
Figure 3B:

FIG. 3b shows an enlargement of a copy of the image of FIG. 3a. At a normal distance of assessment the deformation of the original image is clearly perceptible, so that the mirror image of FIG. 1a is also visible now—this time in negative. In this case the minimum line width is only 30 μm. It is advantageous to select the non-modulated line width as small as possible, as the provision of an out-of-focus filter in the copier may even cause the total absence of the lightest parts from the copy, so that the copy and the original are visibly distinct.

A major advantage of the security element according to the invention, in particular the picture concealed in the image which represents in this case the mirror image of FIG. 1a, is that it extends over a considerable surface area of the perceptible image, in this case the entire surface. The effect of this is that the copying-security element is fully incorporated in the image of the support to be protected, and moreover, in such a way that the perceptibility of the first image does not—or only scarcely—decrease. The picture concealed in the image as a result of the deformation can also represent a code which is, for example, composed of alphanumeric symbols or a bar code. In that case the copier may be provided with appropriate reading circuits.

Figure 4A:
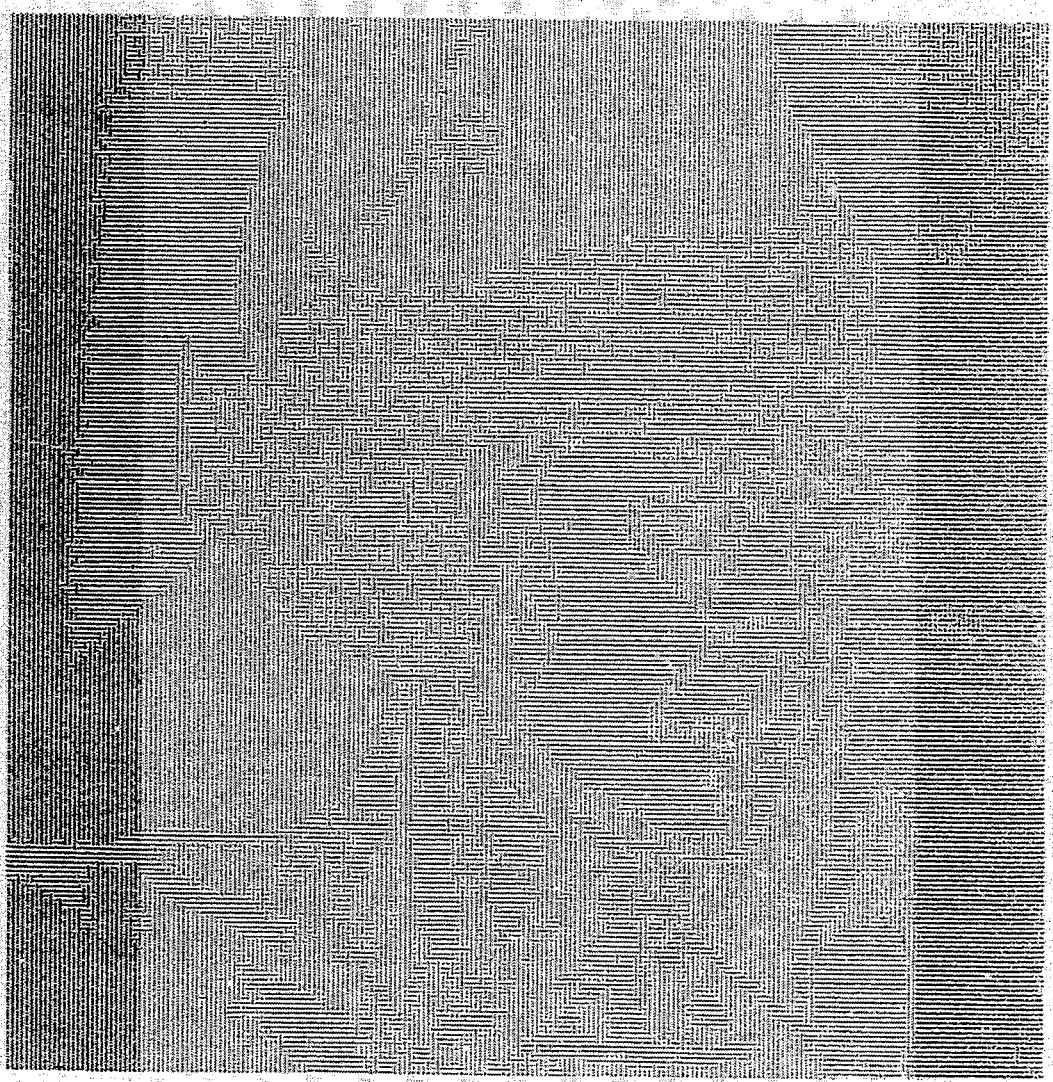
FIG. 4a shows an enlargement of the substantially uniform image on a support according to the invention which is provided with a second embodiment of a copying-security element.
Figure 4B:
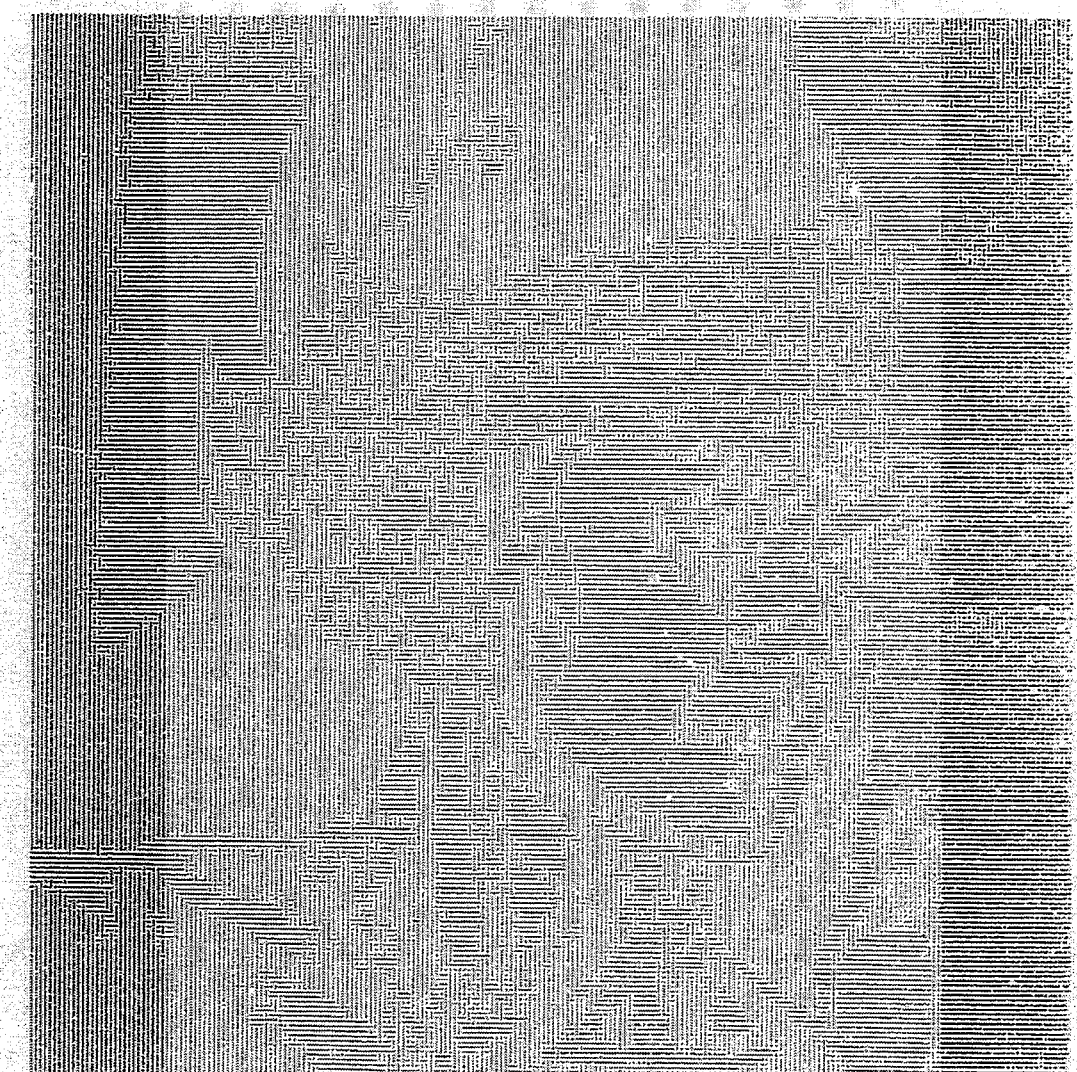

FIG. 4a shows an enlargement of a substantially uniform image on a support according to the invention, wherein a second embodiment of the copying-security element is provided which comprises a deformation of raster pixels into line segments which are orientated in accordance with the following function:

$$\phi_i = \frac{(d(x,y) - d_{gem})}{|d(x,y) - d_{gem}|} \cdot \frac{\pi}{4} + \frac{\pi}{4} \quad (2)$$

wherein $\Phi_i$ is the angle of the image segment i with the horizontal, d(x,y) is the gradation value of the picture at the point with coordinates (x,y), and $d_{gem}$ is an average gradation value. Therefore, each line segment is inclined at an angle of 0 or $\pi/2$, and the function Φ is a binary function. The average value $d_{gem}$ can, for example, equal half of the maximum gradation value of the original picture or which is the limit set by the printing process. FIG. 4b shows a partial enlargement of FIG. 4a.

Figure 4C:
Figure 4D:
FIG. 4d shows a partial enlargement according to FIG. 4c.
Figure 5A:
Figure 5B:

FIG. 4c shows an enlargement of a copy of the image on the support according to FIG. 4a, wherein the copy clearly shows the deformation, even at a normal distance of assessment by the human visual system. FIG. 4d shows a partial enlargement of FIG. 4c.

In a way similar to that of FIGS. 3a and 3b, FIGS. 5a and 5b show an enlargement of an image and its copy, respectively, wherein the image according to FIG. 4a is superposed on the image according to FIG. 1a.

It is noted that the examples with respect to the figures are only meant to illustrate a support provided with a security element according to the invention.

It will be obvious to the expert that many variations of the above-described embodiments of the support according to the invention are feasible within the scope of the invention. Therefore, other deformations of the image element can be selected than the ones described, including a deformation comprising local translations of the image elements. The foregoing numerical values are only meant to be illustrative and may be adjusted to the specifications of the copiers. The invention also relates to supports provided with an image that is visually perceptible and that is obtained by means of so-called frequency modulation techniques.

I claim:

1. A support provided with a machine-detectable copying security element comprising a first image perceptible to the human visual system and comprising multi-tone portions formed by image elements, said first image incorporating a second image detectable by a copying machine but substantially imperceptible to the human visual system and being formed by a deformation of at least a number of said image elements forming said first image.

2. A support provided with a machine-detectable copying security element comprising a first image, perceptible to the human eye at a normal distance of assessment, composed of image elements, at least a number of the image elements having a deformation in relation to a rounded dot, wherein this deformation is not perceptible to the human visual system at a normal distance of assessment, but is detectable by a copying machine.

3. A support according to claim 2, wherein the image elements are divided according to a raster pattern.

4. A support according to claim 3, wherein each deformed image element has an angular orientation in a plane of the support.

5. A support according to claim 4, wherein the angular orientation corresponds to a degree of deformation.

6. A support according to claim 2, wherein the deformed image elements consist of line segments.

7. A support according to claim 2, wherein the deformed image elements define a latent image reproducible by a copying machine as a visible addition to the first image.

8. A support according to claim 7, wherein said latent image is superposed on said first image.

9. A support according to claim 8, wherein the degree of deformation of each of the deformed image elements is a function of the gradation value of a corresponding image element of the first image.

10. A support according to claim 9 wherein the function is a binary function.

11. A support according to claim 8, wherein the raster pattern is essentially regular, and the first image is defined by variations in the surface area of individual image elements of the first image.

12. A support according to claim 7, wherein the latent image comprises a bar code.

13. A support according to claim 2, wherein the density of the deformed image elements is beyond the discerning capacity of the human visual system at a predetermined distance of assessment, so that the latent image is perceived by humans as a single tone image.

14. A support provided with a machine detectable copying security element comprising a first image perceptible to the human visual system and formed by image elements, said first image incorporating a second image that is substantially imperceptible to the human visual system, hence forming no portion of said perceived first image, said second image being formed by a deformation of at least a number of said image elements, said second image being detectable by a copying machine.

15. An image support carrying an image perceptible to the human visual system, said support having an image support axis, said image being composed of line segments arranged in a regular raster pattern, each line segment forming an angle with respect to the image support axis, at least one of the line segments forming a maximum angle, at least another of the line segments forming a minimum angle, the angles formed by the other line segments varying continuously between the minimum and maximum angles, the angular orientations of said line segments being substantially imperceptible to the human visual system, and said image being reproducible by copying.

16. An image support according to claim 15, wherein the continuous variation of the angles of the line segments within an area of the image is a continuous function of the gradation value of a security element forming an area identical to said area of the image, said image and said security element being reproducible by copying.

17. An image support according to claim 16, wherein said function is:

$$\phi_i = \frac{(d(x,y) - d_{min})}{(d_{max} - d_{min})} \pi + \phi_0$$

wherein is $\phi_i$ the angle formed by line segment i having coordinates (x,y) within the area of the raster pattern, d(x,y) is the gradation value of the security element at the point (x,y) within the area of the security element, $d_{min}$ is the minimum gradation value, $d_{max}$ is the minimum gradation value, and $\phi_0$ is an initial angle.

18. A method of producing a regular raster pattern for printing an image perceptible to the human visual system on an image support, said regular raster pattern having a raster axis, said regular raster pattern consisting of raster picture elements each consisting of a line segment, the method comprising providing each line segment with an individual angular orientation with respect to the raster axis, at least one of the line segments forming a maximum angle with respect to the raster axis, at least another of the line segments forming a minimum angle with respect to the raster axis, the angles formed by the remaining line segments varying continuously between the minimum and maximum angles, said angular orientations of said line segments being substantially imperceptible to the human visual system.

19. A method of producing a regular raster pattern for printing an image perceptible to the human visual system on an image support, said regular raster pattern having a raster axis, said regular pattern consisting of raster picture elements each consisting of a line segment, the method comprising providing each line segment with an individual angular orientation with respect to the raster axis, at least one of the line segments forming a maximum angle with respect to the raster axis, at least another of the line segments forming a minimum angle with respect to the raster axis, the angles formed by the remaining line segments varying continuously between the minimum and maximum angles, said continuously varying angles of the line segments within an area of the raster pattern being a continuous function of a gradation value of a security element forming an area identical to said area of the raster pattern, said angular orientations of said line segments being substantially imperceptible to the human visual system, said image and said security element being reproducible by copying.

20. A method of producing a regular raster pattern for printing an image perceptible to the human visual system on an image support, said regular raster pattern having a raster axis, said regular pattern consisting of raster picture elements each consisting of a line segment, the method comprising providing each line segment with an individual angular orientation with respect to the raster axis, at least one of the line segments forming a maximum angle with respect to the raster axis, at least another of the line segments forming a minimum angle with respect to the raster axis, the angles formed by the remaining line segments varying continuously between the minimum and maximum angles, said continuously varying angles of the line segments within an area of the raster pattern being a continuous function of a gradation value of a security element forming an area identical to said area of the raster pattern, said function being defined by the expression:

$$\phi_i = \frac{(d(x,y) - d_{min})}{(d_{max} - d_{min})} \pi + \phi_0$$

wherein $\Phi_i$ is the angle formed by the line segment i having coordinates (x,y) within the area of the raster pattern, d (x,y) is the gradation value of the security element at the point (x,y) within the area of the security element, $d_{min}$ is the minimum gradation value, $d_{max}$ is the maximum gradation value, and $\Phi_O$ is an initial angle, said angular orientations of said line segments being substantially imperceptible to the human visual system, said image and said security element being reproducible by copying.

* * * * *